United States Patent [19]

Merz

[11] Patent Number: 4,773,797

[45] Date of Patent: Sep. 27, 1988

[54] DEVICE FOR LOADING CONTAINERS FOR PARTICULATE MATERIALS AND THE USE THEREOF

[75] Inventor: Walter Merz, Küsnacht, Switzerland

[73] Assignee: Swiss Aluminium Ltd., Caracas, Venezuela

[21] Appl. No.: 920,167

[22] Filed: Oct. 17, 1986

[30] Foreign Application Priority Data

Oct. 31, 1985 [CH] Switzerland .......................... 4683/85

[51] Int. Cl.$^4$ ............................................. B65G 53/36
[52] U.S. Cl. ...................................... 406/156; 406/32; 406/109; 406/141; 141/198; 141/35; 141/46; 141/225
[58] Field of Search ...................... 406/28, 32, 95, 107, 406/109, 124, 126, 127, 132, 155, 156, 163, 14, 25, 23, 33, 141; 141/198, 199, 206, 35, 46, 225

[56] References Cited

U.S. PATENT DOCUMENTS

| | | | |
|---|---|---|---|
| 2,668,001 | 2/1954 | Harstick | 141/35 |
| 4,082,364 | 4/1978 | Krambrock | 406/33 |
| 4,450,053 | 5/1984 | Merz et al. | 204/67 |
| 4,529,337 | 7/1987 | Hilgraf et al. | 406/163 |
| 4,615,648 | 10/1986 | Merz | 406/95 |

FOREIGN PATENT DOCUMENTS

| | | | |
|---|---|---|---|
| 2333942 | 1/1975 | Fed. Rep. of Germany | 406/156 |
| 3103279 | 1/1983 | Fed. Rep. of Germany | 406/156 |
| 128879 | 11/1978 | Japan | 406/23 |

*Primary Examiner*—Galen Barefoot
*Assistant Examiner*—Paul E. Salmon
*Attorney, Agent, or Firm*—Bachman & LaPointe

[57] ABSTRACT

A device for loading containers that are open or can be vented, containers for fine particulate materials, said device being part of a pneumatic conveyance system, in particular such a system using dense layer transportation, where the said device comprises essentially a tube-shaped casing, a lifting element, a closing element and a lifting rod which connects the lifting and closing elements and enables the distance between these elements to be varied. The combined weight of the part of the lifting element, that can be moved in the axial direction (A), the closing element and the lifting rod is greater than the elastic force of the lifting element but is smaller than the product of the difference between areas ($F_H$) and ($F_M$) and the positive pressure in the supply line acting on the lifting element. The distance (h) of the closing element from the lower edge of the casing is smaller than the stroke of the lifting element. The device can be employed on an alumina silo for charging fused salt electrolytic cells used in the production of aluminum, on a plastic powder silo, a cement silo or a quartz silo for foundries.

10 Claims, 3 Drawing Sheets

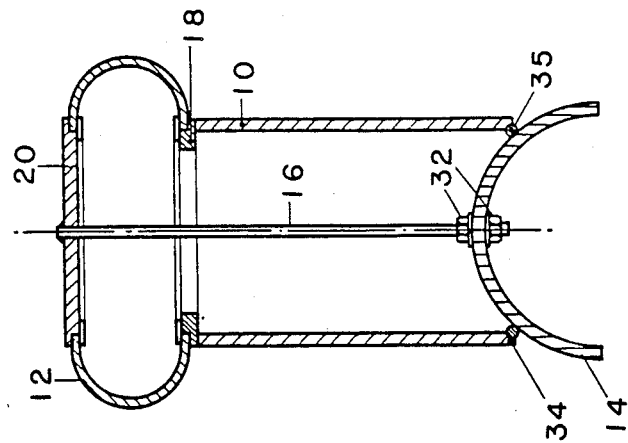
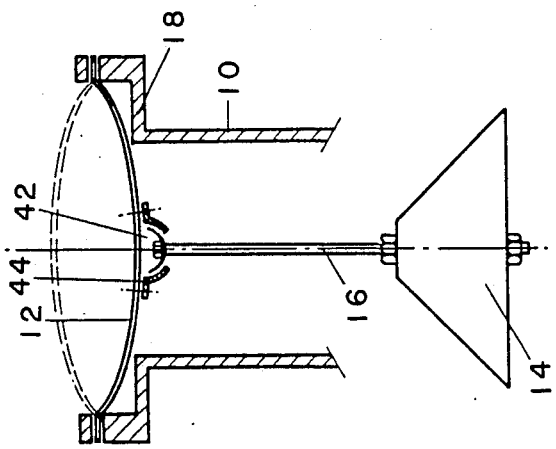
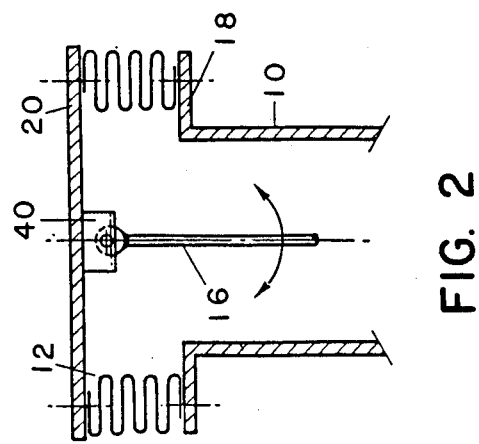

DEVICE FOR LOADING CONTAINERS FOR PARTICULATE MATERIALS AND THE USE THEREOF

BACKGROUND OF THE INVENTION

The invention relates to a device for loading containers that are open or can be vented, containers for fine particulate materials, said device being part of a pneumatic conveyance system, in particular such a system using dense layer transportation. The invention relates also to the use of the said device.

Pneumatic transportation systems for moving fine particulate material feed the said material from a main supply line to a plurality of containers, usually in the form of silos. A branch supply line runs from the main supply line to each feeding port in the containers, regardless of whether each silo features one or more such inlets. However, in known conveyance systems, apart from these branch supply lines other facilities must be provided in order that the filling process stops at a given point in time and the container in question closed:

For each loading point two valves are necessary, one in the main supply line and one in the branch supply line.

For each loading point or each container a level switch is necessary when there is a plurality of loading points in each container.

On loading the containers all loading points are charged in succession in that the main supply line is closed off immediately behind the branch supply line in question and the latter opened for feeding. This process is controlled by an electronic switching circuit which receives regulatory impulses from the level switches.

Problems have often been encountered with mechanically actuated shut-off valves as the granular-to-dusty material being charged can penetrate the bearings and impair their function. In U.S. Pat. Nos. 4,615,648 and 4,450,053 a marked improvement is proposed in that branch supply lines can be connected up to dense layer feeding systems without requiring mechanical devices in the supply line. Using magnetic valves a plug of material can be formed in the branch connection and namely such which do not extend to the ball valve in the supply line. On the one hand this enables supply systems to be constructed that do not require branches or three-way valves, and on the other hand the ball valves that close off the supply lines are protected from direct contact with the particulate material. When the ball valve is open, contact with the particulate material is less dangerous for that ball valve. In the case of branch supply lines for loading containers the magnetic valves that shut off the compressed air supply to the dense layer conveyance system are regulated via level switches.

The object of the present invention is to develop a device for a pneuamtic system for conveying fine particulate material to a plurality of loading points for charging containers that can be vented, in particular dense layer transportation systems, the said device being simple, energy-saving and designed to load the said containers and close the inlet charging port/ports of the container without individual level switches or other individual regulating systems being necessary, and such that the said device can be employed for a wide range of applications.

SUMMARY OF THE INVENTION

The foregoing object is achieved according to the invention by way of a rigidly mounted pipe-shaped casing having an upper flange with two pipe lengths projecting into it for connecting up to the supply line, a lifting element of flexible material that is attached to the upper flange, effectively seals the casing and, vertical to the axial direction of the casing features an inner surface area $F_H$ which is at least twice the inner surface area $F_M$ of the casing, a closing element which can be moved in the axial direction and is for closing off the lower end of the casing, and a lifting rod that is attached to the lifting element and allows the height of the closing element to be varied, and such that the combined weight of the part of the lifting element, that can be moved in the axial direction, the closing element and the lifting rod is greater than the elastic force of the lifting element but smaller than the product of the difference between the surface areas $F_H$ and $F_M$ and the positive pressure in the supply line acting on the lifting element, and the distance of the closing element from the lower edge of the casing is smaller than the stroke of the lifting element.

The device according to the invention is not associated with any lifting action by the fine particulate material. It has therefore nothing in common with a float. It is self-regulating. In the filling position the weight of the moveable part of the lifting element, the rod and the closing element presses the lifting element together. When during the filling process the particulate material reaches the lower edge of the casing, after running over the closing element, then the pressure inside necessary to raise the closing element is built up.

According to a first version of the invention the lifting element comprises a bellows type of cylinder made essentially of a synthetic material, preferably synthetic rubber. This material can feature a mesh inlay or another type of reinforcement such as is known from the automobile tire industry. The bellows type of cylinder comprises, depending on the size of stroke required for the closing element, preferably one to three individual bellows each, usually, with a stroke of 20–100 mm. The end face of the bellows cylinder is in practice in the form of a metal plate in which the pulling rod is securely mounted. Furthermore, the individual bellows can have ring-shaped metal inserts with supporting feet which prevent the bellows from closing completely and so make it easier to build up the pressure.

According to a further version the lifting element can be in the form of a wavy metal hose which is preferably of aluminum, steel or brass and is fitted with a plate to secure the lifting rod.

Finally, the lifting element can be in the form of a pre-shaped membrane which changes over from the lower position to the upper position when the pressure is applied to it. This membrane is comprised, for example, of a synthetic material with or without a mesh inlay or reinforcement, or of a metal whereby the same materials are employed as for the bellows shaped cylinder or wavy metal hose. Facilities with a lifting element made of pre-shaped membrane can, however, be employed only when relatively small strokes are required, for example up to 40 mm.

The surface area of the lifting element $F_H$ which is effective when pressure is applied, preferably amounts to 2-5 times the inner surface area of the casing $F_M$. For practical reasons the device according to the invention is normally conceived such that $F_H$ is 2.5-3.5 times the value of $F_M$, in particular 3 times that value.

The closing element which seals off the lower end of the casing when pressure is applied is usefully in the form of a blunted cone that tapers upwards. The closing element can, however, also be in a form of a spherical element facing upwards e.g. hemisphere, spherical zone, sector or segment of a sphere or of a sphere. After it is raised, the closing element projects partly into the casing, which represents the closed position.

Depending on the elastic force produced by the lifting element, the closing element can at least partly be hollow, which correspondingly reduces the lifting force required.

The seal between the closing element and the lower opening in the casing can be improved for example by inserting a sealing means in the casing. In the simplest case an O-ring is inserted there.

The lifting rod connecting the lifting element and the closing element is in a first version rigidly attached at one end to the lifting element or its end plate and at the other end carries the closing element. This version of the lifting rod used in the device according to the invention penetrates and is attached to one to two alignment means inside the casing.

According to a second or third version the lifting rod is linked to the lifting element or its end plate by means of a hinge or a ball joint. In this case the central alignment in the casing is omitted and the closing element is centred as it is raised due to the conical or ball shape of the said element.

The lifting rod can be in the form of a threaded rod which can then be screwed into the lifting element or its end plate and allows the height of the closing element to be set by means of a nut situated above and another below it. Of course the lifting rod can also be without a thread and the rigid attachment to the lifting element or the end plate achieved by welding, the elevation of the closing element by means of other known clamping or fixing elements.

The device according to the invention can be employed for loading and closig all containers for fine particulate material which do not have to be loaded selectively. A particularly advantageous application is the loading and closing of alumina silos on fused salt electrolytic cells used in the production of aluminum. Depending on the cell size two to six silos are arranged each fitted with a device according to the invention. For example every six hours the dense layer conveying equipment leading to the silos mounted on the cells is switched on and the silos refilled. Using the same main supply line it is possible to charge for example twelve electrolytic cells, the said silos being filled one after the other in the direction in which the charge is conveyed. The level indicator, of conventional construction and mode of operation mounted on the last silo, switches off the dense layer conveying unit automatically.

The device according to the invention can, analogously, be employed in numerous branches of industry such as for example in conveyance facilities for plastic powder, cement or powdered quartz.

BRIEF DESCRIPTION OF THE DRAWINGS

The invention is described in greater detail in the following with the aid of the drawings which are longitudinal schematic cross-sections:

FIG. 2: A first version of the lifting element and the means of attachment to the lifting rod.

FIG. 3: A second version of the lifting element and the attachment to the lifting rod, featuring a closing element.

FIG. 4: A version of the device, in particular the lower part of the casing with the closing element.

DETAILED DESCRIPTION

Figure 1:
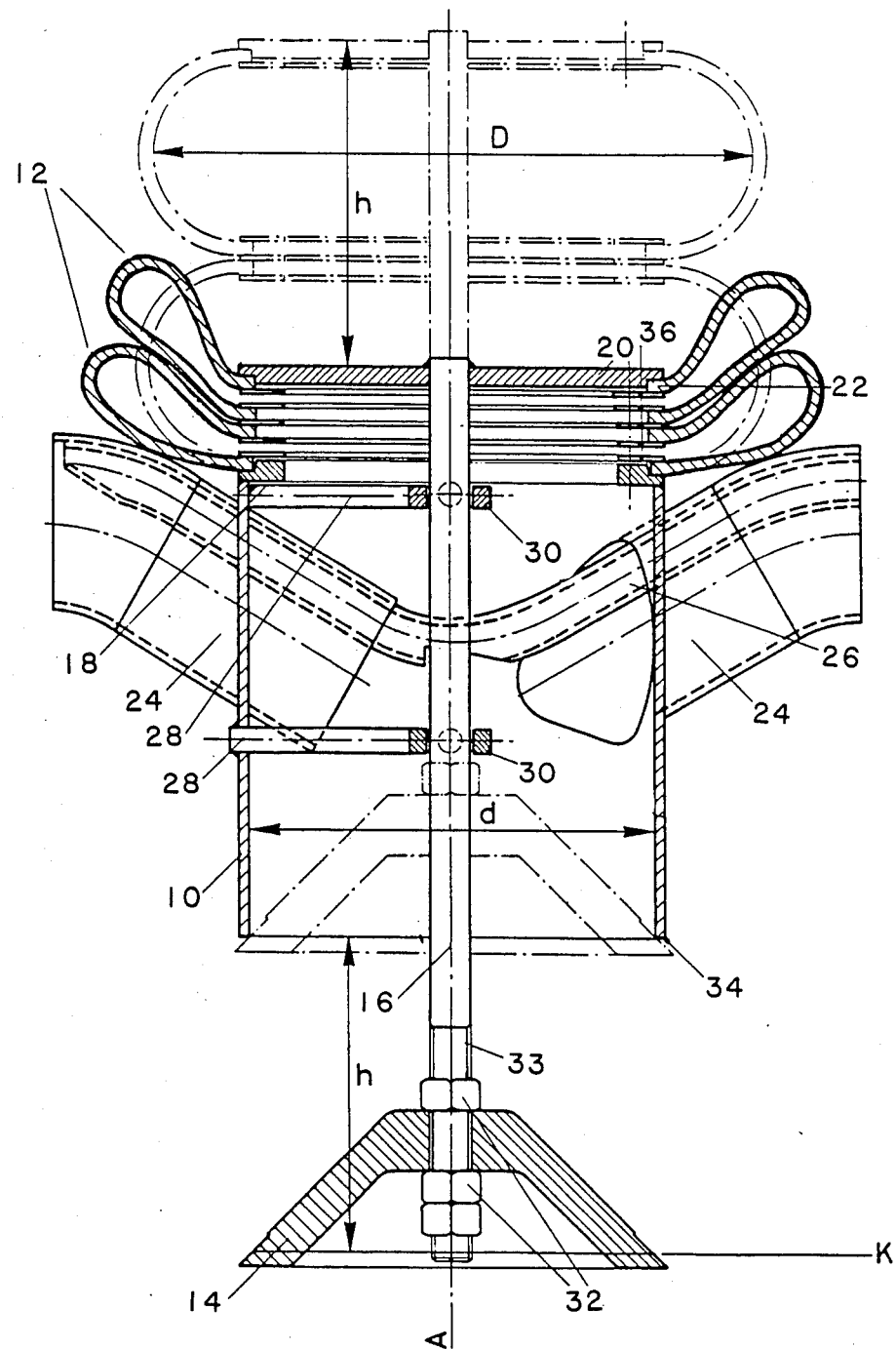
FIG. 1: The concept of a device.

The device for loading and closing containers that can be vented, shown in FIG. 1, comprises essentially of
a tube-shaped casing 10
a lifting element 12
a closing element 14, and
a lifting rod 16 which connects the lifting element and the closing element with a distance between them that can be varied.

In the present case the lifting element 12 is made up of double bellows. This is attached in a conventional manner to an upper flange 18 of the casing 10. The double bellows unit of synthetic rubber is closed at the top by a flat metal end plate 20 at position 22. The lifting rod 16 is welded to the end plate 20 in the region of the longitudinal axis A of the casing 10, and projects axially into the casing 10.

The upper region of the casing 10 features two slightly upwards sloping tube lengths 24 that face each other diagonally and are connected up to the supply line; these tube lengths 24 serve as inlet and outlet pipes in the dense layer conveying system. The supply line 26 for the delivery air is indicated by broken lines.

Mounted a distance apart in the casing 10 are two alignment means comprising two arms 28 perpendicular to the casing wall and a sleeve 30 for the lifting rod 16.

Attached to the lower region of the lifting rod 16 by threaded nuts 32 is the closing element 14 which is in the form of a hollow blunt cone tapering upwards; the lower part of the lifting rod 16 features a corresponding thread 33.

A circle K corresponding exactly to the inner circumference of the casing 10 is indicated on the surface of the cone. The distance h of this circle K from the lower edge 34 of the casing 10 corresponds to the length of stroke of the double bellow-shaped lifting element 12, which can be readily seen from the closed position indicated by broken lines.

The inner diameter d of the casing 10 delimits the area $F_M$, the inner diameter D of a bellow the area $F_H$.

The weight of the closing element 14, the lifting rod 16 and the moveable part of the lifting element 12 pulls the double bellows together. Metal rings 36 with downward pointing dimples, cams or the like or radial openings prevent the bellows from closing completely.

The lifting element 12 shown in FIG. 2 is in the form of a metal expandable corrugated tube while the lifitng rod 16 is attached to the end plate 20 by means of a hinge 40. As a result the lifting rod 16 can swing freely in the casing 10 provided its freedom is not limited by a means of alignment in the casing.

FIG. 3 shows the lifting element 12 in the form of a dished membrane that can reverse its concavity. The upper position, adopted when pressure is applied to it, is indicated by a broken line. The lifting rod 16 is attached to the membrane or a holder 44 via a ball joint 42. The lifting rod can therefore move in all directions in the casing 10 and is centred by pulling up the closing element 14. The closing element 14 is in the form of a blunted cone.

The closing element 14 in FIG. 4 is a hollow hemisphere which opens downwards and is attached to the lifting rod 16 by means of a pair of threaded nuts 32. The closing element 12 is shown in the raised position; pressure has been created inside the casing 10 and the lifting element 12. In order to provide a better seal the lower edge 34 of the casing 10 is fitted with a seal 35 in the form of an O-ring which rests directly against the spherical surface.

Figure 7:
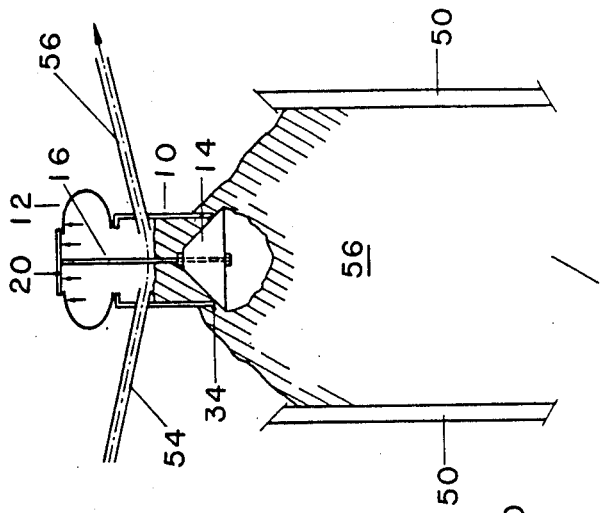
FIG. 7: The silo shown in FIGS. 5 and 6 at the end of the loading process showing the raised closing element.
Figure 6:
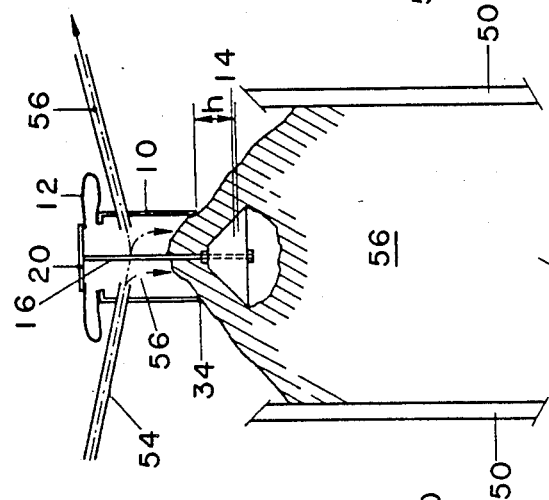
FIG. 6: The silo shown in FIG. 5, at the stage where the charged fine particulate material has reached the casing.
Figure 5:
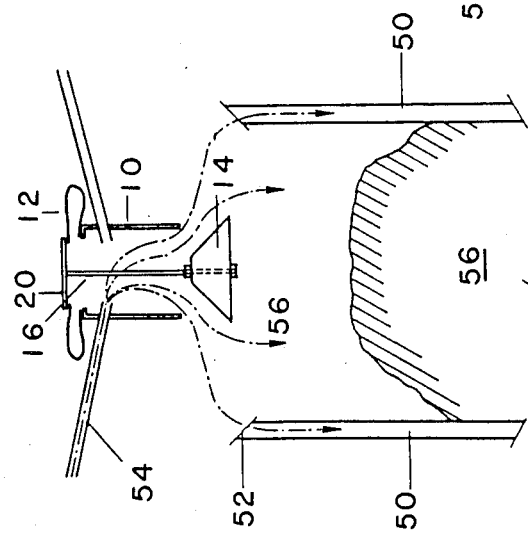
FIG. 5: The upper region of a silo fitted with the device at the start of loading.

FIGS. 5 to 7 show, very schematically, devices according to the invention in alumina silos of which only the upper part is shown here; also indicated is the sequence of the loading process. The alumina silos 48 have at least one evacuation line 50 or a corresponding venting casing, the upper edge 52 of which is arranged such that the air can enter unhindered, but, because of the angle of friction, the particulate material poured into the silo can not reach that point when the maximum level is reached. In practice, the silos 48 are closed at the top and the casing 10 is mounted securely in the entry port/ports.

As shown in FIG. 5 the alumina reaches the device via supply line 54 with the aid of the necessary amount of air for dense layer transport. Due to the combined weight of the blunt cone 14 closing element 16, the lifting rod 16 and the end plate 20, the lifting element 12, comprising a single bellows unit, is in the collapsed position. The alumina 56 pours over the blunted cone into the silo 48; the air likewise flows into the container and escapes to the outside via the venting line 50.

This filling process lasts until the alumina 56 has reached the lower edge 34 of the casing 10. This stage is shown in FIG. 6. Now the air flowing freely into the alumina silo 48 is initially reduced and with further filling up completely stopped. This causes pressure to build up in the casing and in the lifting element. A part of the alumina 56 fills the casing 10, another part is already being transported to the next alumina silo.

As the surface area $F_H$ of the bellows is approximately three times as large as the surface area $F_M$ inside the casing, the steadily increasing pressure inside gradually creates sufficient force to raise the closing element 14 and the lifting rod 16. The maximum pressure in the casing 10 and the lifting element 12 is reached when the closing element has travelled the stroke distance h and presses flush against the lower edge 34 of the casing 10. That stage is indicated in FIG. 7.

After the closure of the first alumina silo this first route of least resistance is no longer available for the fine particulate material and for the air. Consequently all the alumina 56 is transported by the delivery force to the next silo which is likewise fitted with a device according to the invention. The same charging process as shown in FIGS. 5 to 7 is repeated there.

The last alumina silo is fitted with a level switch which, when the silo is full, switches off the dense layer conveying unit.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:
1. Device for loading containers with fine particulate material comprising:
   (a) a rigidly mounted pipe-shaped casing having a lower edge and an upper flange;
   (b) a lifting element of flexible material having an elastic force, said lifting element being movable in an axial direction (A) through a first distance and attached to the upper flange for effectively sealing the upper flange of the casing wherein said flexible material vertical to the axial direction (A) of the casing features an inner surface area ($F_H$) which is at least twice the inner surface area ($F_M$) of the casing;
   (c) pipe means projecting into said casing and connected to a pressurized source for selectively providing a positive pressure on said lifting element for moving said lifting element in axial direction (A);
   (d) a closig element movable in the axial direction (A) through a second distance for closing off the lower edge of the casing; and
   (e) a lifting rod attached to the lifting element and the closing element wherein the combined weight of the lifting element movable in the axial direction (A), the closing element and the lifting rod is greater than the elastic force of the lifting element and less than the product of the difference between the surface areas ($F_H$) and ($F_M$) and the positive pressure provided on the lifting element wherein the second distance is smaller than the first distance.

2. A device according to claim 1 wherein the lifting element comprises a bellows of a synthetic material having a metal end plate to which the lifting rod is attached.

3. A device according to claim 1 wherein the lifting element is an expandable, corrugated metal pipe.

4. A device according to claim 1 wherein the lifting element is a pre-shaped compressible membrane.

5. A device according to claim 1 wherein the inner surface area ($F_H$) of the lifting element is 2 to 5 times the inner surface area ($F_M$) of the casing.

6. A device according to claim 1 wherein the inner surface area ($F_H$) of the lifting element is 2.5 to 3.5 times the inner surface area ($F_M$) of the casing.

7. A device according to claim 1 wherein the closing element has a round face facing upwards such that the said element projects partly into the casing when closing off the lower edge.

8. A device according to claim 7 wherein the closing element is at least partly hollow.

9. A device according to claim 1 wherein the lifting rod is attached rigidly to the lifting element and penetrates at least one alignment means mounted securely inside the casing.

10. A device according to claim 1 wherein the lifting rod is linked to the lifting element by means of a hinge.

* * * * *

UNITED STATES PATENT AND TRADEMARK OFFICE
CERTIFICATE OF CORRECTION

PATENT NO. : 4,773,797

DATED : September 27, 1988

INVENTOR(S) : Walter Merz

It is certified that error appears in the above-identified patent and that said Letters Patent is hereby corrected as shown below:

On the Cover Page, Column 1, change the Assignee section to read as follows:

--Swiss Aluminium Ltd., Chippis, Switzerland--.

In Column 6, Claim 1, line 27, change "closig" to read --closing--.

Signed and Sealed this

Twenty-eighth Day of March, 1989

Attest:

DONALD J. QUIGG

*Attesting Officer*  *Commissioner of Patents and Trademarks*